United States Patent

[11] 3,609,279

| [72] | Inventors | George G. Giesbrecht<br>Kitchener;<br>Gino Campagnola, Waterloo, Ontario, both of Canada |
| --- | --- | --- |
| [21] | Appl. No. | 850,879 |
| [22] | Filed | Aug. 18, 1969 |
| [45] | Patented | Sept. 28, 1971 |
| [73] | Assignee | Uniroyal Inc.<br>New York, N.Y. |

[54] WEAR-RESPONSIVE ELECTRODE-WITHDRAWAL CONTROL SYSTEM FOR AN ELECTRICAL DISCHARGE MACHINE
3 Claims, 4 Drawing Figs.

| [52] | U.S. Cl. | 219/69 G |
| --- | --- | --- |
| [51] | Int. Cl. | B23p 1/14 |
| [50] | Field of Search | 219/69 F, 69 G, 69 V |

[56] References Cited
UNITED STATES PATENTS
3,125,700  3/1964  Bentley et al. .................. 219/69 G X

*Primary Examiner*—R. F. Staubly
*Attorney*—Charles A. Blank

ABSTRACT: In an electrical discharge machine, an electrohydraulic servosystem positions an electrode near a workpiece to erode the workpiece until a depth control limit switch is actuated by a mechanism coupled through a magnetic clutch to the electrode-carrying member. After the electrode is worn to such an extent that it must be replaced a second limit switch is actuated before the actuation of the depth control limit switch, causing a withdrawal of the electrode to an upper position where the electrode can be replaced after completion of the erosion made during the positioning of the electrode when the second limit switch is actuated.

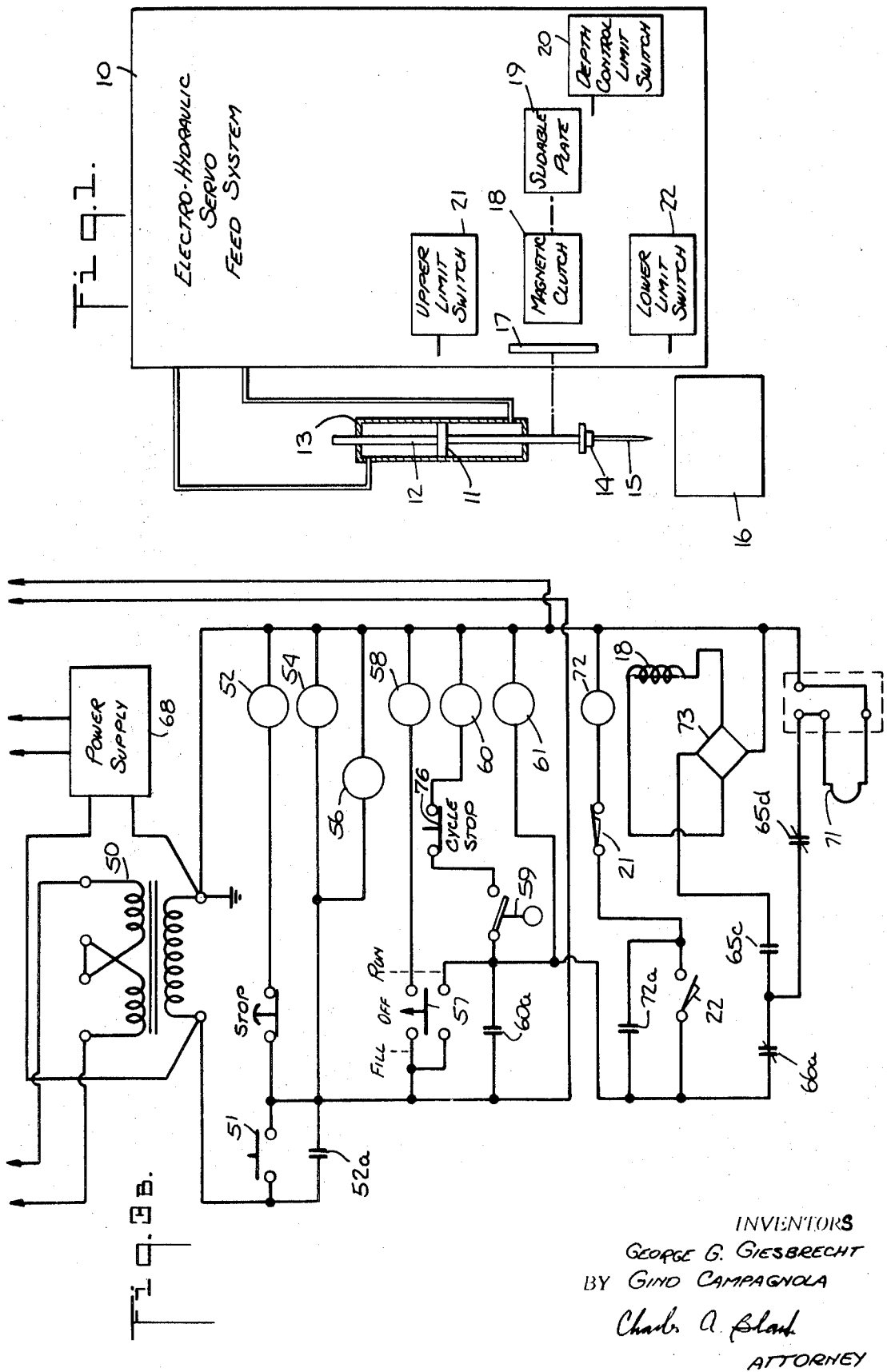

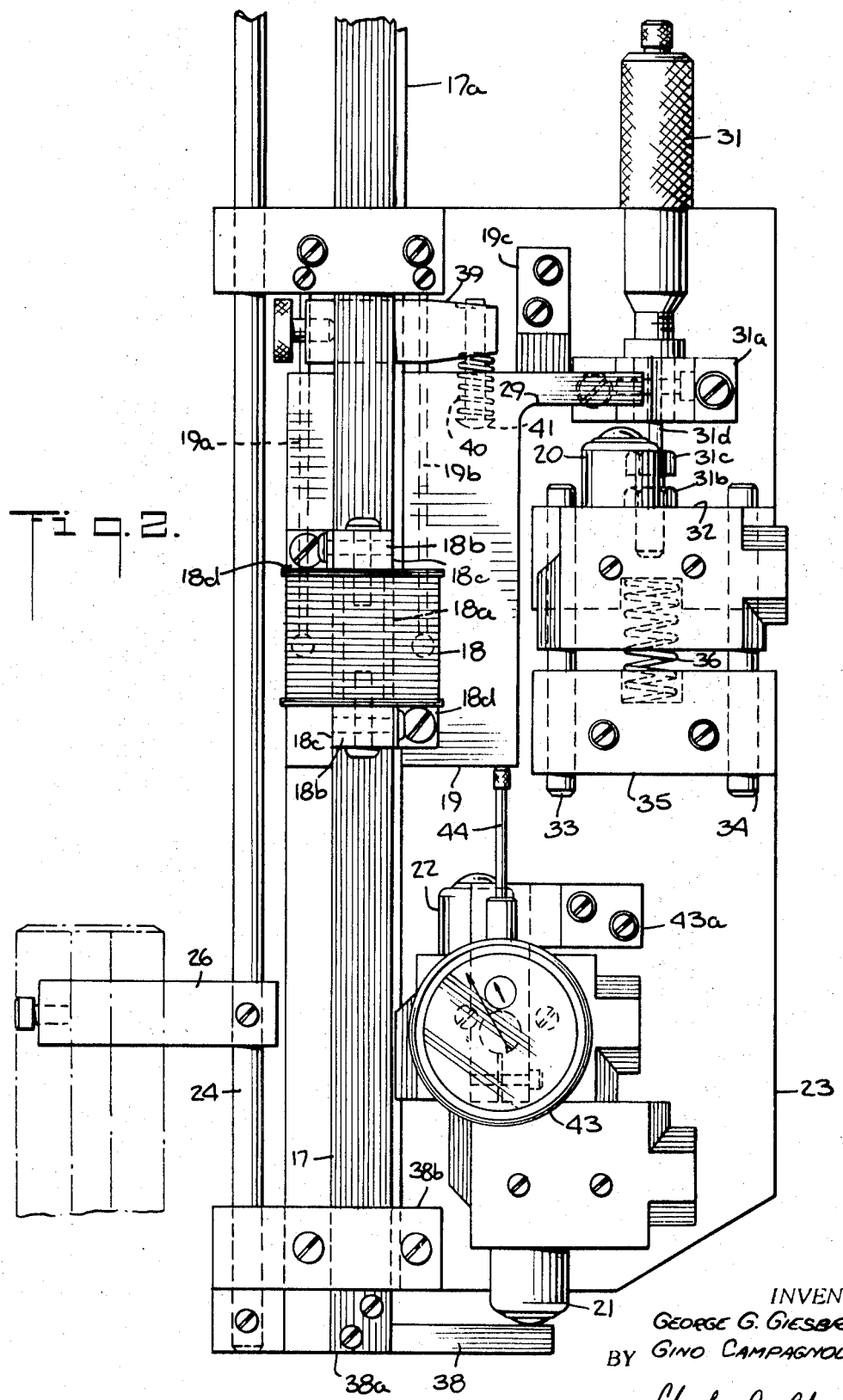

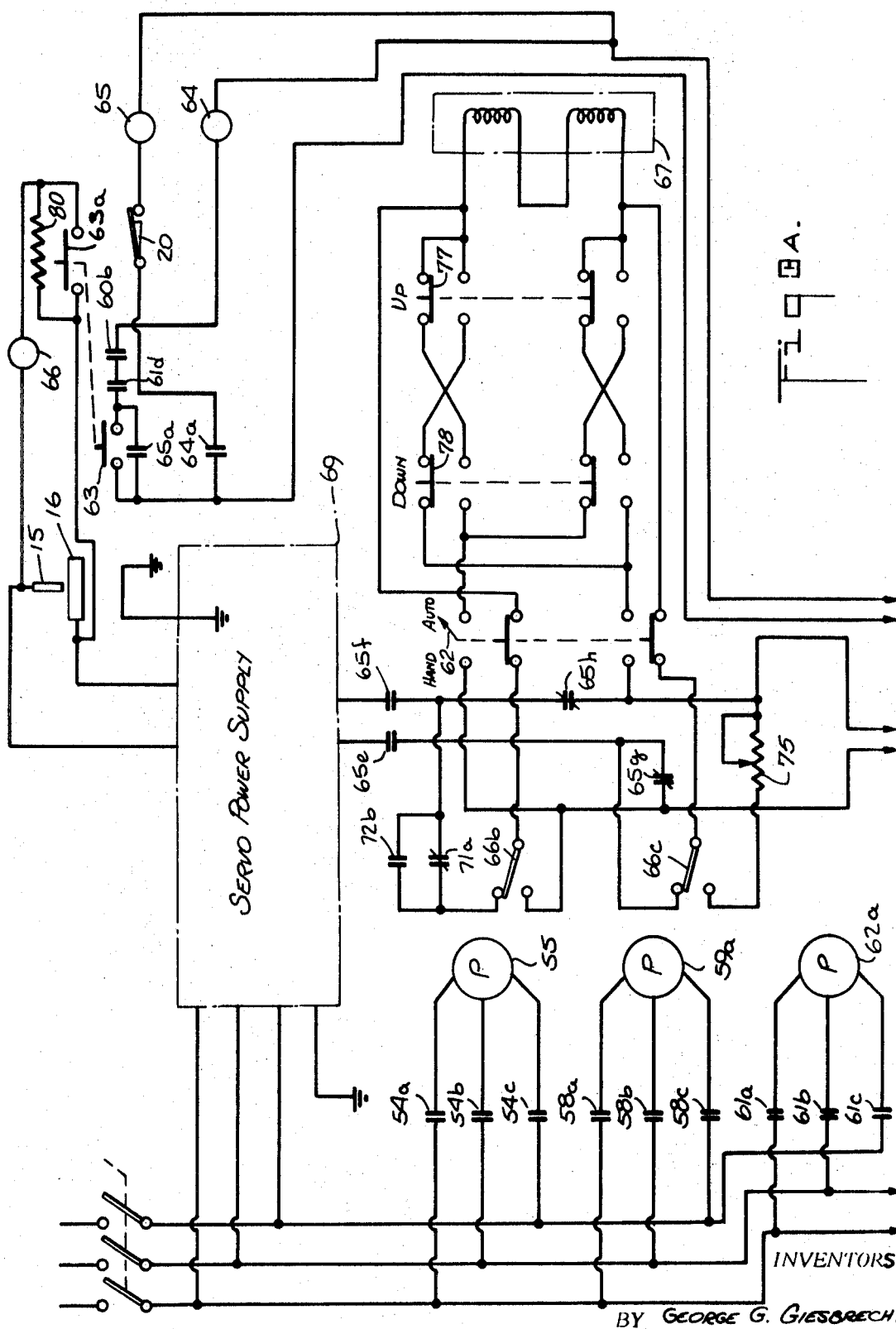

WEAR-RESPONSIVE ELECTRODE-WITHDRAWAL CONTROL SYSTEM FOR AN ELECTRICAL DISCHARGE MACHINE

CONTROL SYSTEM

This invention relates to control systems, particularly electrohydraulic power feed systems for electrical discharge machines.

In electrical discharge machines an electrode is utilized to erode a workpiece, such as a tire mold, to form a slot therein by causing a series of intermittent electrical discharges across the gap between the electrode and the workpiece. It is well known that the electrode wears off while eroding the workpiece. In eroding a steel workpiece, brass electrode wear can be so high that twice as much material is worn off the electrode as is removed from the slot.

While various systems have been utilized to compensate for the electrode wear, no such system has been suggested for determining during positioning of the electrode toward the workpiece that the electrode is sufficiently worn to require replacement while allowing the machine to complete the slot erosion made during the positioning of the electrode before automatically removing the electrode holder to a position where the electrode can be replaced.

It is an object to the present invention, therefore, to provide a new and improved control system for an electrical discharge machine which avoids one or more disadvantages of prior systems.

In accordance with the invention, in electrical discharge machining apparatus for translating current flow across a gap between electrode and a workpiece to erode the workpiece, a control system comprises hydraulic means for supporting an electrode and electrohydraulic servo means for positioning the hydraulic means and the electrode relative to the workpiece approximately to maintain a predetermined gap between the electrode and the workpiece during erosion of the workpiece. The servo means includes means responsive to the electrode-supporting means for determining during positioning of the electrode toward the workpiece that the electrode has worn at least to a predetermined length. The servo means also includes means responsive to the electrode wear-determining means for causing the hydraulic means to withdraw from the workpiece to a position where the electrode can be replaced after completion of the erosion made during the positioning of the electrode toward the workpiece when the electrode wear-determining means determines that the electrode has worn at least to the predetermined length.

For a better understanding of the present invention, together with other and further objects thereof, reference is made to the following description, taken in connection with the accompanying drawings, and its scope will be pointed out in the appended claims.

Referring now more particularly to the drawings:

FIG. 1 is a schematic diagram of a control system in accordance with the invention;

FIG. 2 is a view in front elevation of a portion of the FIG. 1 control system; and FIGS. 3A and 3B are a schematic diagram of the electrical portion of the control system.

Referring now more particularly to FIG. 1 of the drawings, there is represented an electrohydraulic servo feed system 10 for controlling the position of a piston 11 having a piston rod 12 attached thereto within cylinder 13. The piston rod 12 supports an electrode holder 14 for carrying a machining electrode 15 and for positioning the same relative to a workpiece 16.

The electrohydraulic servo feed system thus far described may be of the type described in U.S. Pat. No. 2,984,761 entitled Hydraulic Servo Feed.

As more fully explained subsequently, there is mechanically linked to the piston rod 12 an auxiliary rod 17 which moves in accordance with the displacement of the piston rod 12. When the gap between the electrode 15 and workpiece 16 is sufficiently small, an electric discharge occurs across the gap and, through circuit means to be described subsequently, a magnetic clutch 18 becomes magnetically linked to the rod 17 and movable therewith. One surface of the magnetic clutch 18 is attached to a nonmagnetic slidable plate 19 which moves with the rod 17 and the magnetic clutch 18. When the slidable plate 19 has moved a distance corresponding to depth of the erosion desired, the slidable plate 19 actuates a depth control limit switch 20 which causes the electrode 15 to withdraw from the workpiece 16 as hereinafter described.

The apparatus also includes an upper-limit switch 21 which is actuated when the electrode is withdrawn to a maximum upper position. There is also provided a lower-limit switch 22 which is actuated when the wear of the electrode is sufficiently great that the lower-limit switch is actuated before the depth control limit switch is actuated while the electrode is being displaced further into the workpiece.

Referring now more particularly to FIG. 2 of the drawings, in conjunction with FIG. 1, a portion of the control system is there represented. A baseplate 23 is mounted in a fixed position. A pair of rods 24, 17 are slidably mounted on the baseplate. The rod 24 is attached by means of coupling arm 26 to the piston rod 12 (FIG. 1) carrying the electrode. A slidable plate 19, carrying a direct current coil operative as a magnetic clutch 18, is slidable with the rod 17 when electromagnetically linked thereto as will be explained subsequently. An iron core 18a extends through the coil 18 and utilizes a pair of pole bars 18b, 18b attached to the core 18a for retaining the coil 18 in position. Suitable brass shims 18c, 18c surround pole bars 18b, 18b to facilitate release of the coil 18 from the rod 17. A pair of angle brackets 18d, 18d are utilized to mount the coil 18 and pole bars 18b, 18b on the slide 19. The slidable plate 19 has an arm 29 for actuating depth control limit switch 20 which is adjustably mounted on the baseplate 23 by means of micrometer 31 which is held by a suitable support 31a. The limit switch is mounted on a movable bar 32 positioned by the micrometer 31 and slidable along pins 33, 34. A fixed support 35 utilizing a spring 36 is effective to bias the support 32 in an upward direction. The screw 31c and jam nut 31b are utilized to set the relation of the micrometer barrel tip and the limit switch 20. The screw 31c can be used initially to adjust the micrometer to read zero when the limit switch 20 contacts the arm 29. The jam nut 31b locks the screw 31c in place on bar 32 after the initial adjustment. After the initial adjustment, when the micrometer 31 is turned, the micrometer shaft 31d moves the screw 31c away from micrometer support 31a, thereby moving bar 32 and switch 20 away from arm 29.

The system also includes an upper-limit switch 21 suitably mounted on the baseplate 23 and actuated by an arm 38 extending from the rod 17.

Behind the rod 17 there is another similar rod 17a also movable with the rod 17 and to which there is attached by a suitable clamp 39 a trip button 41 biased downwardly by spring 40. As will be explained subsequently, the trip button 41 is adjustably positioned to actuate limit switch 22 when the electrode has worn at least to a predetermined length for causing the piston rod 12 to withdraw the electrode to a position where the electrode can be replaced after completion of the cut made in the workpiece during the lowering of the electrode when the limit switch 22 is actuated.

The link 38a attaches the rod 17, the similar rod 17a behind rod 17, and the rod 24 so that the three rods move as a unit in guide block 38b when actuated by the piston rod 12 through coupling arm 26. A similar link (not shown) may be utilized to connect the top portions of the rods 17, 17a and 24.

An indicator 43, mounted on bracket 43a, is provided so that the speed of cutting can be observed although this is not necessary. The indicator registers the depth of the cut plus a distance corresponding to the estimated electrode wear during one cycle in accordance with the position of the slidable plate 19, the bottom face of which actuates the indicator stem 44. The estimated wear of the electrode during the cycle is taken into account as more fully explained hereinafter.

Considering now the operation of the control system with reference to the schematic diagram of FIGS. 3A and 3B, a three-phase power supply feeds the system with one phase applied to transformer 50. When the start button 51 is pressed, the master control relay 52 is energized, thereby closing contacts 52a which hold the relay energized after start button 51 is released. Relay 54 is also energized, closing its contacts 54a, 54b, 54c which cause the motor of the hydraulic pump 55 to be energized. An auxiliary hydraulic cooler motor 56 can be utilized when required. A valve (not shown) is turned to a fill position and selector switch 57 is held in the fill position, thereby causing energization of relay 58 which closes relay contacts 58a, 58b and 58c, energizing fill-drain pump 59a. When the dielectric coolant, such as oil, rises in the work pan to the point where it closes switch 59, the valve may be turned to the run position. The selector switch 57 may then be momentarily held in the run position, thereby causing deenergization of relay 58 and the full-drain pump 59a ceases to operate. Relay 60 is then energized and holding contacts 60a and contacts 60b close. Pressure pump relay 61 is energized and contacts 61a, 61b, and 61c close, energizing the pressure pump 62a. Contacts 61d also close. Coolant under pressure is then applied to the electrode.

With the hand-automatic switch 62 set to automatic, depression of the cycle start button 63 causes energization of relay 64, which closes contacts 64a to energize control relay 65 which closes holding contacts 65a.

When cycle start contacts 63a are closed, relay 66 is energized, opening contacts 66a in the timer and magnetic coil circuit to be described subsequently. Contacts 66b and 66c shift to their positions corresponding to energization of relay 66. The servo valve 67 is then energized by connection to the direct current power supply 68 through an adjustable resistor 75 controlling the speed at which the piston rod 12 moves the electrode toward the workpiece. When the cycle start contacts 63a open upon release of the cycle start button 63, the relay 66 remains energized by the smaller current flow therethrough and through resistor 80.

When the electrode is very close to the workpiece with, for example, an electronic envelope or a gap in the range of 0.0036 to 0.0006 inch, such as 0.002 inch, an arc of electrons crosses the gap, reducing the voltage across the gap and causing relay 66 to become deenergized. Relay 66 remains deenergized until the cycle start contacts 63a are closed again in a later cycle. Contacts 66b and 66c shift to the position represented in the drawing and thereby disconnect the servo valve 67 from the power supply 68 and connect the servo valve to the servo power supply 69 through closed timer relay contacts 71a. The servo power supply 69 may be of the type represented in U.S. Pat. No. 2,984,761. The servo power supply supplies a voltage signal to the servo valve 67 which varies in accordance with the position of the electrode and the amount of current flowing across the gap. If the gap becomes larger than desired, the signal from the power supply varies in such a manner as to energize the servo valve to cause the electrode to be fed more quickly into the workpiece. The velocity of the feed of the electrode toward the workpiece can be controlled by the operator's adjustment of the servo power supply to minimize the time lapse before the electrode begins cutting. Such adjustment can also prevent the distance between the electrode and cavity from becoming so great during erosion as the cavity deepens and electrode wear occurs that the spark cannot cross the gap. Also, if the velocity of the feed of the electrode is too great, the operator can adjust the power supply to reduce the velocity.

Similarly, if the gap becomes too small, such as if the electrode touches a workpiece, the signal from the servo power supply energizes the servo valve in such a manner as to cause the electrode to be withdrawn from the workpiece. The velocity of the withdrawal of the electrode from the workpiece can also be controlled by the operator's adjustment of the servo power supply. When the electrode is withdrawn from contact with the workpiece, the servo valve 67 is again energized in such manner to cause the electrode to be fed into the workpiece.

When the relay 66 is deenergized, the coil 18 is energized through a suitable bridge rectifier circuit 73 and relay contacts 65c and 66a. Energization of the coil 18 mounted on the slidable plate 19 magnetically couples the coil 18 to the rod 17 which is movable with the piston rod 12. Thus the motion of the slidable plate 19 occurs at the exact moment when the arc crosses the gap.

The slidable plate 19 is held in its uppermost position against stop 19c by retaining springs 19a and 19b. Upon initial adjustment the depth control limit switch 20 is moved to a selected position corresponding to the depth of slot selected, taking into account estimated electrode wear during a given cycle.

When the electrode has eroded the slot to the desired depth, which depends upon the setting of the micrometer 31, the depth control limit switch 20 is actuated by the arm 29 of the slidable plate 19. The depth control limit switch 20 opens, deenergizing the relay 65 which results in the deenergization of the power relay 64. The opening of contacts 65c deenergizes the coil 18 which then returns on plate 19 to the original uppermost position. The opening of contacts 65e and 65f and the closing of contacts 65g, 65h result in connection of the servo valve for a fast retract movement to the power supply 68 through timing relay contacts 71a which remain closed for a timed interval after the energization of the timer 71 through relay contacts 65d and 66a. At the end of the timed period, the timer contacts 71a open to disconnect the servo valve from the power supply 68. The timed period is normally set so that the electrode clears the workpiece by a very short distance. After repositioning the workpiece, the cycle start button 63, 63a may be pressed again to repeat the cycle.

Because the coil 18 is energized at the time that the electrode arc occurs, the motion of the slidable plate 19 and the measurement of depth begin each time the arc occurs. This, therefore, automatically compensates for electrode wear during the preceding cycle. Additionally, prior to any given cycle an estimate by the operator is made of the amount of electrode wear during one cycle and this estimate is taken into account by lengthening the opening between the arm 29 and the depth control limit switch under the control of the micrometer so that the arm 29 thereof does not strike the depth control limit switch 20 until the arm 29 has moved a distance equal to the desired depth of the slot plus an additional distance corresponding to the estimated electrode wear during the cycle.

However, a point is eventually reached where the electrode is worn to such an extent that it must be replaced. This occurs when the trip switch button 41 actuates the lower-limit switch 22 before the arm 29 of the slidable plate 19 actuates the depth control limit switch 20. The control system is so constructed that if the lower-limit switch 22 is actuated at any point during the cycle, then the system will complete the cycle before stopping. The spring 40 becomes more compressed while the system completes the cycle before stopping. Assuming that the limit switch 22 is actuated during a given cycle, the relay 72 is energized, closing contacts 72a and 72b. This has no effect on the cycle of operation until the timer contacts 71a open at the end of the previously mentioned time period of the cycle. Because contacts 72b are closed in parallel with the timer contacts 71a, the electrode continues to retract from the workpiece after contacts 71a open.

The electrode continues to retract until the upper-limit switch 21 is actuated, thereby deenergizing relay 72. Contacts 72b then open and stop the electrode movement. A new operation can be resumed after the operator replaces the worn electrode.

The brass electrode may originally have a length of, for example, three or four inches and the depth of the slot desired may be, for example, one-fourth inch.

The cycle stop button 76 may be utilized to deenergize relay 60, opening contacts 60b which causes deenergization of power relay 64. Contacts 64a open, deenergizing relay 65 and thus causing the electrode to retract from the workpiece. Timer 71 can not become energized due to contacts 60*a* being open, and the electrode continues to retract until the physical limit of travel is reached or until the operator switches the Hand-Automatic switch 62 to the Hand position. Manual positioning of the piston 12 may be effected by setting switch 62 to the "Hand" position and actuating button 77 or 78 Up or Down motion of the electrode.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

Having thus described our invention, what we claim and desire to protect by Letters Patent is:

1. In electrical discharge machining apparatus for translating current flow across a gap between an electrode and a workpiece to erode the workpiece, a control system comprising:

hydraulic means for supporting an electrode;

electrohydraulic servo means for positioning said hydraulic means and the electrode relative to the workpiece approximately to maintain a predetermined gap between the electrode and the workpiece during erosion of the workpiece;

said servo means including means responsive to said electrode-supporting means for determining during positioning of the electrode toward the workpiece that the electrode has worn at least to a predetermined length;

and said servo means including means responsive to said electrode wear-determining means for causing said hydraulic means to withdraw from the workpiece to a position where the electrode can be replaced after completion of the erosion made during the positioning of the electrode toward the workpiece when said electrode wear-determining means determines that the electrode has worn at least to said predetermined length.

2. A control system in accordance with claim 1 in which said servo means includes means for determining the depth of the erosion including a depth control limit switch and a slidable member movable with said electrode-supporting means when approximately said predetermined gap exists between the electrode and the workpiece, said depth control limit switch being actuated by said slidable member when the erosion reaches a desired depth to stop the erosion.

3. A control system in accordance with claim 2 in which said electrode wear-determining means includes a limit switch actuated in response to said electrode-supporting means, before said depth control limit switch is actuated, after the electrode is worn to less than said predetermined length.